United States Patent Office 3,311,677
Patented Mar. 28, 1967

3,311,677
PHOSPHOROUS, ARSENIC OR ANTIMONY DERIVATIVES OF UREA AND THIOUREA
Günter Oertel, Cologne-Flittard, Hugo Malz, Leverkusen, Hans Holtschmidt, Cologne-Stammheim, and Eberhardt Degener, Leverkusen, Germany, assignors to Farbenfabriken Bayer Aktiengesellschaft, Leverkusen, Germany, a German corporation
No Drawing. Filed Nov. 1, 1962, Ser. No. 234,869
Claims priority, application Germany, Nov. 10, 1961,
F 35,329
10 Claims. (Cl. 260—926)

The object of the present invention is a process for the production of organic compounds of elements of the Main Group V of the Periodic System which is characterised in that compounds of trivalent phosphorus, arsenic or antimony, which contain one or more phosphorus-nitrogen, arsenic-nitrogen or antimony-nitrogen bonds in the molecule, are reacted with isocyanates and/or mustard oils and the trivalent element of the Main Group V of the Periodic System in the reaction products is possibly converted into the pentavalent state, by the action of sulphur or oxygen or of sulphur- or oxygen-yielding agents.

The reaction forming the basis of the process according to the invention, is new and depends on an introduction of the isocyanate or mustard oil group between the phosphorus-, arsenic- or antimony-nitrogen bond, which is illustrated by way of example in the two following equations:

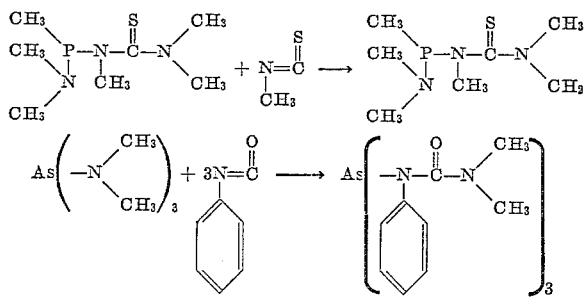

This reaction was in no way to be foreseen and is extraordinarily surprising having regard, for example, to the fact that the amides of carboxylic acids, such as dimethyl formamide or diethyl acetamide, are completely stable to isocyanates or mustard oils, even at elevated temperatures, and are used, as is known, as inert solvents in organic chemistry for isocyanate reactions.

As starting components for the reaction, there are suitable practically all trivalent compounds of phosphorus, arsenic or antimony, insofar as they contain at least one direct phosphorus-, arsenic- or antimony-nitrogen bond. The remaining valencies can be satisfied by any desired organic residues. Furthermore, those compounds are also suitable as starting materials which contain several trivalent phosphorus, arsenic or antimony atoms in the molecules, insofar as these, according to the above basic condition, possess at least one direct phosphorus-, arsenic- or antimony-nitrogen bond via which the reaction with the isocyanate or mustard oil can take place.

For the reaction with the above-mentioned compounds, there are suitable all organic isocyanates, polyisocyanates, mustard oils and poly-mustard oils. The reaction conditions under which the components are brought to reaction vary somewhat with the nature of the starting materials. Whereas the reaction, in most cases, proceeds more or less strongly exothermically even upon simple mixing of the components and, therefore, is carried out with cooling or in inert diluents, such as, for example, ether, petroleum ether, benzene and the like, in some cases, it is expedient, for the initiation of the reaction, to use elevated temperatures and, in the case of using very low boiling starting components, also to use increased pressure. The introduction of catalysts is, in general, not necessary for the reactions of the process according to the invention.

The molar ratios in which the components are reacted with one another depends on the number of phosphorus-, arsenic-or antimony-nitrogen bonds in the trivalent phosphorus, arsenic or antimony compounds and on the kind of function of the isocyanate or mustard oil used. If several phosphorus-, arsenic-or antimony-nitrogen bonds are present in the molecule, the reaction can, in general, be so conducted that these react stepwise or only partially. Furthermore, when using in this case polyisocyanates or poly-mustard oils, it is also possible to produce high molecular compounds as reaction products.

The reaction products obtained by the process according to the invention contain the elements phosphorus, arsenic or antimony in the trivalent state. The products of the process are new, definite organic compounds of the elements phosphorus, arsenic and antimony.

They are, in many cases, distillable or crystallizable and can be stored for long periods of time. By the reaction with sulphur, oxygen or with sulphur- or oxygen-yielding compounds, such as, for example, peroxides or sulphides, they can, if desired, be converted in a second process step into the corresponding compounds of pentavalent phosphorus, arsenic or antimony.

The new compounds of the present application are to be used as plant protection or pest control agents. Furthermore, they are valuable intermediate products for further organic synthesis.

The new compounds of the present invention are effective herbicides. They are applied in usual manner, for instance in aqueous emulsions or suspensions, as post-emergent herbicides or pre-emergent herbicides. The table below shows the herbicidal activity of some of the new compounds:

| Compound Acc. to Example | Application | Concentration | Millet | Beets | Oats | Cotton | Wheat | Mustard | Tomatoes | Beans |
|---|---|---|---|---|---|---|---|---|---|---|
| 23 | Post | 0.4% | 5 | 5 | 3 | 3 | 3 | 5 | 1 | 3 |
| 38 | Post | 0.4% | 5 | 5 | 5 | 1 | 4 | 5 | 5 | 5 |
|  |  | 0.2% | 5 | 5 | 4 | 1 | 3 | 5 | 5 | 5 |
|  |  | 0.1% | 4 | 5 | 3 | 1 | 1 | 5 | 3 | 4 |
|  | Pre | 20 kg./ha | 5 | 5 | 5 | 4 | 4 | 5 |  |  |
|  |  | 10 kg./ha | 5 | 5 | 5 | 4 | 4 | 5 |  |  |
|  |  | 5 kg./ha | 5 | 5 | 5 | 0 | 4 | 5 |  |  |
|  |  | 2.5 kg./ha | 4 | 4 | 5 | 0 | 4 | 5 |  |  |
| 15 | Post | 0.4% | 5 | 5 | 5 | 5 | 5 | 5 | 5 | 5 |
|  | Pre | 40 kg./ha | 5 | 5 | 3 | 1 | 0 | 5 |  |  |
| 16 | Post | 0.4% | 5 | 5 | 5 | 4 | 4 | 5 | 5 | 5 |
| 8 | Post | 0.4% | 5 | 5 | 5 | 5 | 5 | 5 | 5 | 5 |
|  | Pre | 40 kg./ha | 5 | 5 | 5 | 4 | 4 | 5 |  |  |
| 9 | Post | 0.4% | 5 | 5 | 5 | 5 | 5 | 5 | 5 | 5 |
|  | Pre | 40 kg./ha | 5 | 5 | 5 | 4 | 4 | 5 |  |  |
| 10 | Post | 0.4% | 5 | 5 | 5 | 5 | 5 | 5 | 5 | 5 |
|  | Pre | 40 kg./ha | 5 | 5 | 5 | 4 | 4 | 5 |  |  |

The new compounds of the invention may also be used as insecticides. They may be applied in aqueous solutions, emulsions and suspensions or in form of dust. The following table shows the insecticidal activity of some of the new compounds:

MORTALITY IN PERCENT

| Compound Acc. to Example | Concentration, Percent | Caterpillars, P. maculipennis | Drosophila | D. fabae | Spider mites, T. telarius | Systemic, S. granarium |
| --- | --- | --- | --- | --- | --- | --- |
| 19 | 0.1 | 100 | 100 | | | |
| | 0.01 | | 100 | | | |
| 23 | 0.1 | 60 | 100 | 100 | 100 | 100 |
| 29 | 0.1 | 100 | 100 | 100 | [1] 100 | 100 |
| 31 | 0.1 | 100 | 100 | 100 | 100 | 100 |
| 14 | 0.1 | 100 | 100 | 100 | 100 | 100 |

[1] Ovicidal.

Besides, the compounds of the invention are distinguished by a remarkable fungicidal activity. In particular the compounds prepared according to Examples 5, 6, 7, 11, 13, 15 and 16 are of interest, because of their strong activity against powdery mildew.

*Example 1*

Production of

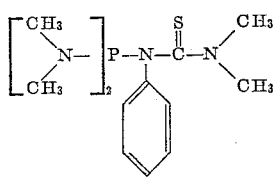

27.4 parts of phenyl mustard oil are added dropwise at 40–50° C. to a solution of 32.6 parts of phosphorous acid tris-(dimethylamide) in 100 parts of ligroin. An exothermic reaction thereby takes place and yellow crystals precipitate out from the solution. After the whole of the phenyl mustard oil has been added dropwise, the resultant crystalline slurry is stirred for 1 hour at 70° C. The crystals are filtered off with suction and dried in a vacuum at 50° C. There are obtained 55 parts (92% of the theoretical) of the above compound in the form of a yellow crystalline powder of melting point 68° C.

*Example 2*

Production of

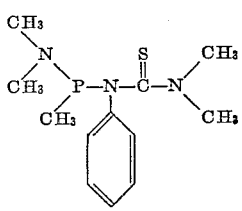

27 parts of phenyl mustard oil are added dropwise at 30–50° C., with cooling, to a solution of 26.8 parts of methyl-phosphonous acid bis-(dimethylamide) in 100 parts of ligroin. A very vigorous reaction takes place by which a red oil gradually separates out from the solution. After the reaction has subsided, this is separated off from the ligroin and heated to 70° C. in a vacuum for the purpose of removing readily volatile components. In the residue there remain behind 54 parts (100% of the theoretical) of the above compound in the form of a yellow-red oil.

*Example 3*

Production of

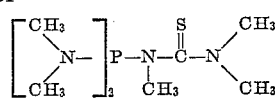

14.6 parts of methyl mustard oil are added dropwise at 30–50° C. to a solution of 32.6 parts of phosphorous acid tris-(dimethylamide) in 50 parts of ligroin. A weakly exothermic reaction takes place and, after about 20 minutes a yellow oil separates out. The mixture is further stirred for 30 minutes at 50° C. and then left to stand overnight. The oil phase hereby crystallizes completely. The crystal cake is comminuted in the supernatent solvent, filtered off with suction, washed with a little ligroin and dried in a vacuum. There are obtained 41 parts (87% of the theoretical) of the above compound in the form of yellow crystals of melting point 66° C.

*Example 4*

Production of

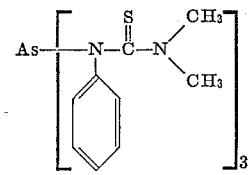

41.5 parts of phenyl mustard oil are added dropwise at 20–50° C. to a solution of 20.7 parts of arsenious acid tris-(dimethylamide) in 50 parts of ligroin. A vigorous reaction takes place with the separation of a viscous oil. After the whole of the mustard oil has been added dropwise, the oil is separated from the ligroin by decantation and triturated with a little ether, whereby it crystallizes completely. The crystals are ground in a mortar, washed with a little ether and dried in a vacuum. There are obtained 55 parts (90% of the theoretical) of the above compound in the form of bright yellow crystals which melt at about 140° C. with decomposition.

*Example 5*

Production of

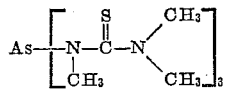

22 parts of methyl mustard oil are added dropwise at 20–50° C. to a solution of 20.7 parts of arsenious acid tris-(dimethylamide) in 150 parts of ligroin. The reaction is strongly exothermic and leads to the separation of white crystals. After the dropwise addition of the mustard oil, the resultant suspension is stirred for 1 hour at 60° C., cooled to room temperature and then filtered off with suction. The crystal mass is washed with a little ligroin and dried in a vacuum at 50° C. There are obtained 42 parts (99% of the theoretical) of the above compound in the form of bright yellow crystals of melting point 115° C.

Example 6

Production of

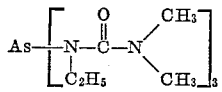

45 parts of ethyl isocyanate are added dropwise at 60–80° C. to 41.5 parts of arsenious acid tris-(dimethylamide). The reaction proceeds exothermically so that cooling with ice water is necessary for the maintenance of the above-mentioned temperature limits.

After the reaction has subsided, the clear yellow oil obtained is heated to 80° C. in a vacuum for the removal of volatile components. In the residue there remain behind 86 parts (99% of the theoretical) of the above compound in the form of a yellow viscous oil.

Example 7

Production of

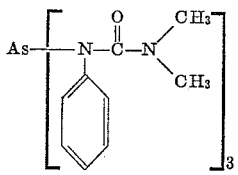

72 parts of phenyl isocyanate are added dropwise at 20–50° C. to a solution of 41.5 arsenious acid tris-(dimethylamide) in 350 parts of ligroin. An exothermic reaction hereby takes place and a white precipitate separates out. This is filtered off with suction, washed with a little ligroin and dried in a vacuum. There are obtained 109 parts (97% of the theoretical) of the above compound in the form of colourless crystals of melting point 140–143° C.

Examples 8–12

According to the process of Example 7 the following compounds are obtained from arsenious-tris-dimethylamide and various isocyanates:

| | | Yield | Melting point |
|---|---|---|---|
| (8) | As[–N(–C₆H₄Cl)–C(O)–N(CH₃)₂]₃ | 99% colourless crystals. | 166° (decomp.). |
| (9) | As[–N(–C₆H₄Cl)–C(O)–N(CH₃)₂]₃ | 97% colourless crystals. | 156°. |
| (10) | As[–N(–C₆H₄CH₃)–C(O)–N(CH₃)₂]₃ | 91% colourless crystals. | 160°. |
| (11) | As[–N(–C₆H₄NO₂)–C(O)–N(CH₃)₂]₃ | 99% light yellow crystals. | 195° (decomp.). |
| (12) | As(–N(C₆H₁₂Cl)–C–N(CH₃)₂)₃ | 99% light yellow oil. | |

Examples 13–16

According to the process of Example 5 the following compounds are obtained from arsenious acid-tris-dimethylamide and various isothiocyanates:

| | | Yield |
|---|---|---|
| (13) | As[—N—C(=S)—N(CH₃)₂ ; phenyl with Cl, Cl]₃ | 99% yellow viscose oil. |
| (14) | As[—N—C(=S)—N(CH₃)₂ ; S=P(OC₂H₅)₂]₃ | 98% yellow oil. |
| (15) | As[—N—C(=S)—N(CH₃)₂ ; phenyl with Cl, Cl]₃ | 99% yellow viscose oil. |
| (16) | As[—N—C(=S)—N(CH₃)₂ ; phenyl-OC₂H₅]₃ | 99% yellow viscose oil. |

Examples 17–23

By reacting phosphorous acid-tris-(dimethylamide) analogously to the processes of Examples 1 and 3 with equimolecular quantities of various isothiocyanates at temperatures of 30–50° C. in ligroin as solvent the following compounds are obtained:

$$\left(\begin{matrix}CH_3\\N—\\CH_3\end{matrix}\right)_2 P—N—\overset{\overset{S}{\|}}{C}—N\begin{matrix}CH_3\\ \\CH_3\end{matrix}$$
$$\qquad\qquad\qquad R$$

| | | |
|---|---|---|
| (17) | R=—⟨phenyl⟩—S—CH₃ | Yellow oil. |
| (18) | R=—⟨phenyl with Cl, Cl⟩ | Yellow oil. |
| (19) | R=—⟨phenyl⟩—Cl, Cl | Yellow oil. |
| (20) | R=—⟨phenyl⟩—OC₂H₅ | Red-brown oil. |
| (21) | R=—⟨phenyl⟩—NO₂ | Brown oil. |
| (22) | R=—CO—⟨phenyl⟩ | Red oil. |
| (23) | R=—P(=S)(OC₂H₅)₂ | Yellow oil. |

Examples 24–29

By reacting methylphosphonous acid-bis-(dimethylamide) analogously to the process of Example 2 with equimolecular quantities of various isothiocyanates at temperatures of 30–50° C. in benzene or ligroin as solvent the following compounds are obtained:

$$(CH_3—)_2N \atop CH_3\phantom{xx}\!\!\!\!\!P—N—\overset{\overset{S}{\|}}{C}—N\begin{matrix}CH_3\\ \\CH_3\end{matrix}$$
$$\qquad\qquad R$$

| | | |
|---|---|---|
| (24) | R=CH₃ | Colourless oil, boiling point= 120–123°, n$_D^{20}$=1,5520. |
| (25) | R=—⟨phenyl⟩—SCH₃ | Yellow oil. |
| (26) | R=—⟨phenyl with Cl, Cl⟩ | Yellow crystals, melting point=84°. |
| (27) | R=—⟨phenyl⟩—Cl, Cl | Red Oil. |
| (28) | R=—⟨phenyl⟩—OC₂H₅ | Red oil. |
| (29) | R=—P(=S)(OC₂H₅)₂ | Yellow oil. |

Examples 30–34

Analogous to Examples 1–3 and 17–29 the following compounds are obtained from various phosphorus amides and isothiocyanates:

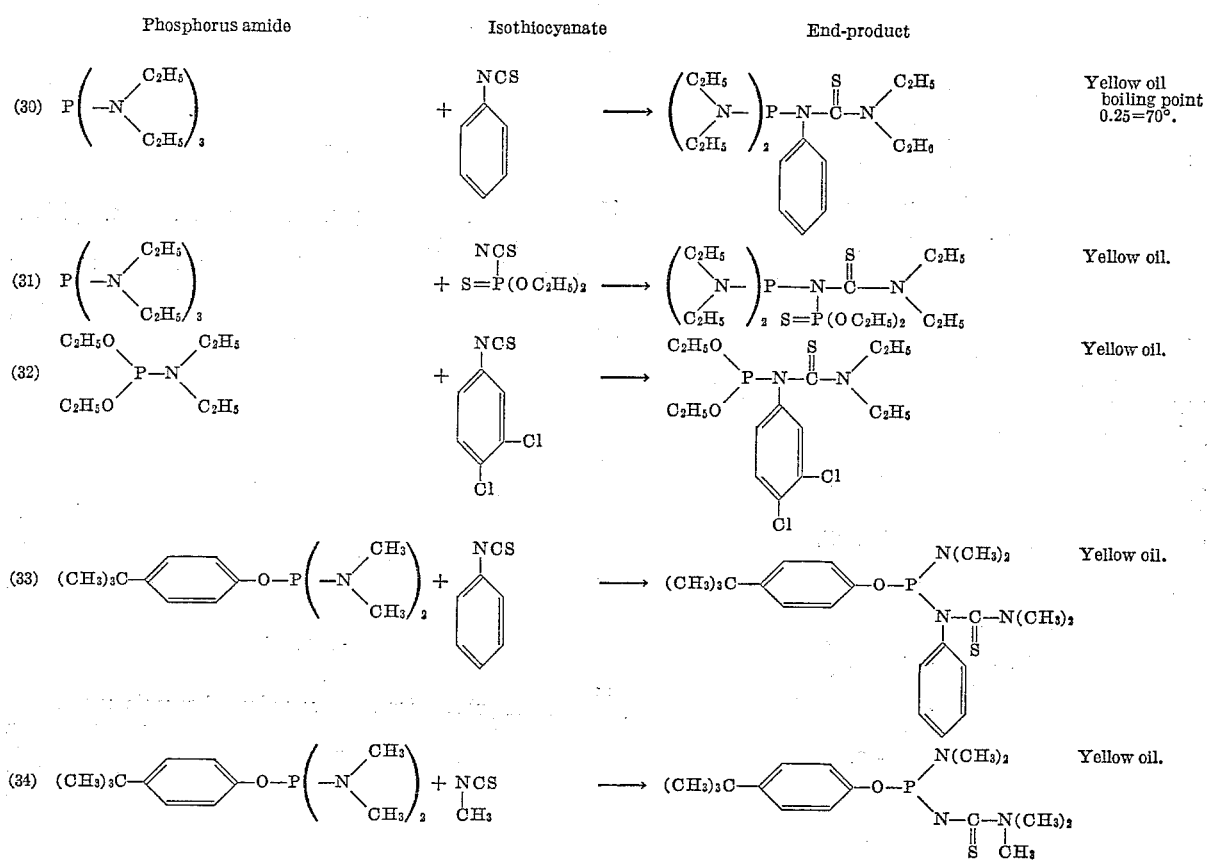

temperature of 80° C. from volatile constituents. In the residue there remain behind 47 parts (86% of the theoretical) of the above compound in form of a clear yellow oil.

Example 35

Preparation of

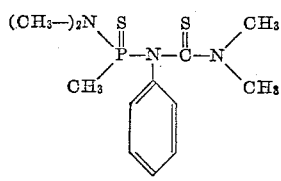

24 parts of the compound described in Example 25 are dissolved in 30 parts of benzene. 2.5 parts of powdered sulphur are added to the solution with cooling at 40–60° C. By concentrating the resulting clear solution by evaporation in vacuum there are obtained in the residue 27 parts of the above compound in form of a yellow oil.

Example 36

Preparation of

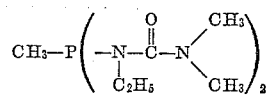

30 parts of ethylisocyanate are added dropwise at 40–50° C. with cooling to 26.8 parts of methyl phosphonous acid-bis-(dimethylamide). After the exothermic reaction has subsided the mixture is stirred at 60° C. for another hour and then liberated in vacuum of 1 mm. Hg at a bath

Example 37

Preparation of

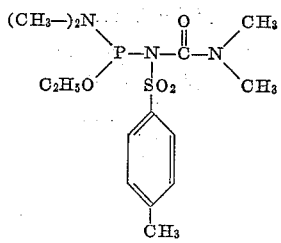

A solution of 19.7 parts of p-tolyl-sulphonyl isocyanate in 20 parts of benzene are added dropwise to 16.4 parts of phosphorous acid monoethylester-bis-(dimethylamide) in 40 parts of benzene at 20–60° C. with good stirring. The resulting clear solution is stirred at 60° C. for 15 minutes and then evaporated in vacuum. In the residue there remain 35 parts of the above compound in form of a clear yellow oil.

Example 38

Preparation of

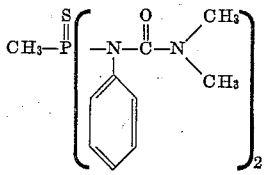

26.8 parts of methyl phosphonous acid-bis-(dimethyl-amide) are dissolved in 50 parts of ligroin. 48 parts of phenylisocyanate are added to the solution at 30–40° C. with cooling. Upon the dropwise addition of the isocyanate yellow crystals precipitate. The crystals dissolve as the reaction proceeds. After the dropwise addition of the isocyanate the mixture is slowly heated to 70° C. whereupon a clear solution is first obtained from which a red oil precipitates after a short period of time. After cooling the reaction mixture the oil phase is decanted, washed with little ligroin and dried in vacuum at a bath temperature up to 70° C. There are obtained 73 parts of a red oil of the following formula

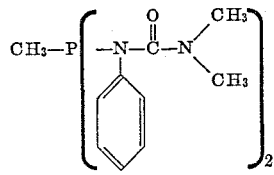

37.2 parts of the oil are dissolved in 50 parts of benzene. 3.2 parts of powdery sulphur are added to the solution at 40 to 50° C. After the exothermic reaction has subsided there is obtained a clear solution which is heated to 60–80° C. for 1 hour and then evaporated in vacuum. In the residue there remain 40 parts of the above compound in form of a light brown clear oil.

We claim:

1. The compound of the formula

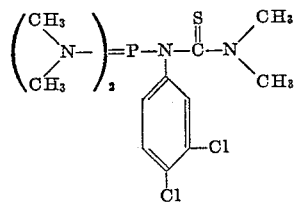

2. The compound of the formula

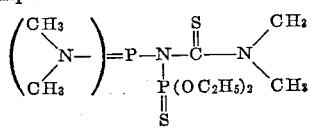

3. The compound of the formula

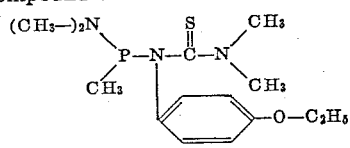

4. The compound of the formula

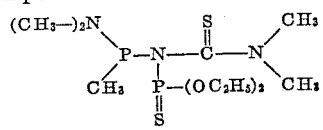

5. The compound of the formula

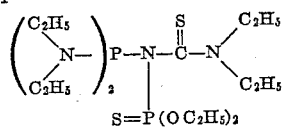

6. The compound of the formula

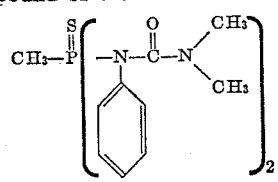

7. A compound of the formula

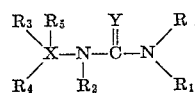

wherein

X stands for phosphorus,

Y stands for oxygen or sulfur,

R and $R_1$ stand for methyl or ethyl, $R_2$ stands for methyl, ethyl, phenyl, chlorophenyl, nitrophenyl, methylphenyl, chlorohexyl,

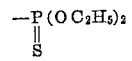

ethoxyphenyl, methylmercapto phenyl or methyl benzene sulfonyl, $R_5$ stands for zero when X is trivalent and for oxygen or sulfur when X is pentavalent, and $R_3$ and $R_4$ stand independently for dimethyl amino, methyl, diethylamino, ethoxy, propylphenoxy and another group

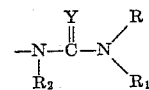

where R, $R_1$, $R_2$ and Y are defined as above.

8. The compound according to claim 7 wherein X is trivalent phosphorus, $R_3$ is diethylamino or dimethylamino, Y is sulfur, $R_4$ is methyl, dimethylamino or diethylamino and $R_2$ is chlorophenyl, ethoxy phenyl or the group

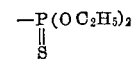

9. A process for the production of organic compounds of phosphorus in the trivalent state comprising reacting a compound of trivalent phosphorus which compound contains at least one phosphorus to the nitrogen of a tertiary amine bond with isocyanates or isothiocyanates whereby the isocyanate or isothiocyanate is introduced between the phosphorus to nitrogen bond and recovering the reaction product thus formed.

10. A process for the production of organic compounds of phosphorus in the pentavalent state which comprises
    (a) Reacting a compound of trivalent phosphorus which compound contains at least one phosphorus to the nitrogen of a tertiary amine bond with isocyanates or isothiocyanates whereby the isocyanate or isothiocyanate is introduced between the phosphorus to nitrogen bond,
    (b) Treating the reaction product thus formed with a compound selected from the group consisting of sulphur, sulphur-yielding agents, oxygen or oxygen-yielding agents thereby converting the trivalent phosphorus to the pentavalent state, and
    (c) Recovering the reaction products thus formed.

References Cited by the Examiner

UNITED STATES PATENTS

| | | | |
|---|---|---|---|
| 2,580,847 | 1/1952 | Schubert | 260—446 |
| 2,835,652 | 5/1958 | Haven | 260—461 |
| 2,965,668 | 12/1960 | Tolkmith | 167—22 |
| 3,048,631 | 8/1962 | Audrieth et al. | 260—551 |
| 3,157,662 | 11/1964 | Smeltz | 260—553 XR |

OTHER REFERENCES

Arnold et al.: Chemical Reviews, vol. 57, pp. 49–50 (1957).

Houben-Weyl: Methoden der Organischen Chemie, 4th ed., Band XII/I, part 1, p. 179, Stuttgart, Germany, 1963.

JOHN D. RANDOLPH, *Primary Examiner.*

TOBIAS E. LEVOW, *Examiner.*

ERNESTINE C. BARTLETT, *Assistant Examiner.*